(12) United States Patent
Zhang (10) Patent No.: US 11,692,526 B2
(45) Date of Patent: Jul. 4, 2023

(54) WIND TURBINE GENERATOR, AND MINIMUM ROTATIONAL SPEED CONTROL METHOD AND DEVICE THEREFOR

(71) Applicant: BEIJING GOLDWIND SCIENCE & CREATION WINDPOWER EQUIPMENT CO., LTD., Beijing (CN)

(72) Inventor: Xinli Zhang, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/998,027

(22) PCT Filed: Mar. 30, 2021

(86) PCT No.: PCT/CN2021/084047
§ 371 (c)(1),
(2) Date: Nov. 4, 2022

(87) PCT Pub. No.: WO2022/001252
PCT Pub. Date: Jan. 6, 2022

(65) Prior Publication Data
US 2023/0167801 A1    Jun. 1, 2023

(30) Foreign Application Priority Data
Jun. 28, 2020    (CN) .......................... 202010597821.3

(51) Int. Cl.
*F03D 7/02*    (2006.01)
(52) U.S. Cl.
CPC .......... *F03D 7/0276* (2013.01); *F03D 7/0224* (2013.01); *F03D 7/0272* (2013.01);
(Continued)

(58) Field of Classification Search
CPC .... F03D 7/0224; F03D 7/0272; F03D 7/0276; F05B 2260/96; F05B 2270/327; F05B 2270/328
See application file for complete search history.

(56) References Cited

U.S. PATENT DOCUMENTS

| | | | |
|---|---|---|---|
| 11,248,584 B2 * | 2/2022 | Thomsen | F03D 7/0264 |
| 2013/0161956 A1 * | 6/2013 | Evans | F03D 7/04 416/61 |

(Continued)

FOREIGN PATENT DOCUMENTS

| | | |
|---|---|---|
| CN | 103758698 A | 4/2014 |
| CN | 108361079 A | 8/2018 |

(Continued)

OTHER PUBLICATIONS

International Search Report in related PCT Application PCT/CN2021/084047, dated Jun. 24, 2021 (9 pages).

*Primary Examiner* — Tulsidas C Patel
*Assistant Examiner* — Thomas K Quigley
(74) *Attorney, Agent, or Firm* — Bayes PLLC (57) ABSTRACT

Methods and Apparatuses for rotational speed avoidance control of a wind turbine, and the wind turbine are provided. An exemplary method includes: identifying whether a wind turbine operates repeatedly traversing a rotational speed avoidance range, based on statistical information about a rotational speed of a generator being in the rotational speed avoidance range; and adjusting a parameter of a pitch control system and/or a parameter of an electromagnetic torque control of the wind turbine based on the statistical information about the rotational speed being in the rotational speed avoidance range, in response to determining that the wind turbine operates repeatedly traversing the rotational speed avoidance range.

16 Claims, 6 Drawing Sheets

(52) U.S. Cl.
CPC ..... *F05B 2260/96* (2013.01); *F05B 2270/327* (2013.01); *F05B 2270/328* (2013.01)

(56) References Cited

U.S. PATENT DOCUMENTS

2018/0245568 A1* 8/2018 Pedersen ............... F03D 7/0244
2019/0285051 A1* 9/2019 Thomsen .............. F03D 7/0276

FOREIGN PATENT DOCUMENTS

| | | |
|---|---|---|
| CN | 110657066 A | 1/2020 |
| EP | 3080444 A | 6/2015 |
| WO | 2015085465 A1 | 6/2015 |
| WO | 2019092603 A1 | 5/2019 |

* cited by examiner

WIND TURBINE GENERATOR, AND MINIMUM ROTATIONAL SPEED CONTROL METHOD AND DEVICE THEREFOR

CROSS-REFERENCE TO RELATED APPLICATIONS

This application is the national phase of International Application No. PCT/CN2021/084047, filed on Mar. 30, 2021, which claims the priority to Chinese Patent Application No. 202010597821.3, filed on Jun. 28, 2020. The entire contents of each of the above-identified applications are expressly incorporated herein by reference.

TECHNICAL FIELD

The present disclosure generally relates to the technical field of wind power generation, and more particularly, to a wind turbine, and a method and apparatus for rotational speed avoidance control of the wind turbine.

BACKGROUND

As the capacity of a wind turbine increases, the wind turbine equipped with a high-flexible tower becomes popular due to its high performance in power generation and low cost. However, the high-flexible tower has a low inherent frequency, which may result in an overlapping of a double frequency component in an operating speed of the wind turbine with the inherent frequency of the high-flexible tower. In a conventional design, the minimum rotational speed of the generator rotor is necessary to be limited, in order to avoid the wind turbine at the minimum rotational speed vibrating in resonance with a first-order frequency of the tower. Such rotational speed control is referred to as rotational speed avoidance control. However, since some wind turbines with large impellers have low rated rotational speeds at present, the above limit on the minimum rotational speed may result in a narrow range between the minimum rotational speed and the rated rotational speed, thereby causing a problem of poor performance of the wind turbine in power generation. In order to solve this problem, a rotational speed avoidance range may be added while selecting a smaller value of the minimum rotational speed, so as to avoid the tower resonance. The rotational speed avoidance range represents a rotational speed range of a generator rotor in which the rotational speed avoidance control may be applied. However, the rotational speed of the wind turbine is often in or frequently enters the rotational speed avoidance range, which may result in resonance of a wind turbine, increased load, or other safety issues.

SUMMARY

Exemplary embodiments of the present disclosure are intended to provide a wind turbine, a method and apparatus for rotational speed avoidance control of the wind turbine, with which it can be identified the wind turbine operates repeatedly traversing a rotational speed avoidance range, and a parameter of a pitch control system and/or a parameter of an electromagnetic torque control of the wind turbine can be adjusted so as to avoid an abnormality that the wind turbine operates repeatedly traversing the rotational speed avoidance range.

According to an exemplary embodiment of the present disclosure, a method for rotational speed avoidance control of a wind turbine is provided. The method includes: identifying, based on statistical information about a rotational speed of a generator being in a rotational speed avoidance range, whether a wind turbine operates repeatedly traversing the rotational speed avoidance range; and adjusting a parameter of a pitch control system and/or a parameter of an electromagnetic torque control of the wind turbine based on the statistical information about the rotational speed being in the rotational speed avoidance range, in response to determining that the wind turbine operates repeatedly traversing the rotational speed avoidance range.

According to an exemplary embodiment of the present disclosure, an apparatus for rotational speed avoidance control of a wind turbine is provided. The apparatus includes: an abnormality identification unit, configured to identify, based on statistical information about a rotational speed of a generator being in a rotational speed avoidance range, whether a wind turbine operates repeatedly traversing the rotational speed avoidance range; and an adjustment unit, configured to adjust a parameter of a pitch control system and/or a parameter of an electromagnetic torque control of the wind turbine based on the statistical information about the rotational speed being in the rotational speed avoidance range, in response to determining that the wind turbine operates repeatedly traversing the rotational speed avoidance range.

According to an exemplary embodiment of the present disclosure, a wind turbine is provided. The wind turbine includes: a generator, including a stator, and a rotor mechanically connected to an impeller; a converter electrically coupled to a winding of the stator; a data collection module, configured to collect a rotational speed of the rotor of the generator; and a controller, configured to set an electromagnetic torque parameter of the converter, to control the rotational speed of the generator. The controller is configured to perform the method for rotational speed avoidance control as described above.

According to an exemplary embodiment of the present disclosure, a wind turbine is provided. The wind turbine includes: a generator, including a stator, and a rotor mechanically connected to an impeller; a converter electrically coupled to a winding of the stator; a data collection module, configured to collect a rotational speed of the rotor of the generator; and a controller, configured to set an electromagnetic torque parameter of the converter, to control the rotational speed of the generator. The controller includes the apparatus for rotational speed avoidance control of a wind turbine as described above.

According to an exemplary embodiment of the present disclosure, a computer-readable storage medium storing a computer program is provided. The computer program, when executed by a processor, causes the above method for rotational speed avoidance control of a wind turbine to be implemented.

With the wind turbine, the method and apparatus for rotational speed avoidance control of the wind turbine according to the exemplary embodiments of the present disclosure, it can be identified the wind turbine operates repeatedly traversing a rotational speed avoidance range, and a parameter of a pitch control system and/or a parameter of an electromagnetic torque control of the wind turbine can be adjusted, so as to avoid an abnormal resonance, overloading, or other problem of the wind turbine due to the rotational speed frequently entering or often being in the rotational speed avoidance range. Thereby, a safety and reliability of the wind turbine can be ensured.

Other aspects and/or advantages of a general concept of the present disclosure are partially set forth in the following description. Some other aspects and/or advantages are apparent from the description, or may be known from the general concept of the present disclosure.

BRIEF DESCRIPTION OF DRAWINGS

The above and other objectives and features of exemplary embodiments of the present disclosure will become more apparent from the following description in conjunction with the accompanying drawings that exemplarily illustrate the embodiments.

DETAILED DESCRIPTION

Reference is made in detail to embodiments of the present disclosure, examples of which are illustrated in the accompanying drawings. Throughout the drawings, a same reference sign refers to a same part. The embodiments are described below with reference to the drawings, in order to explain the present disclosure.

Figure 1:
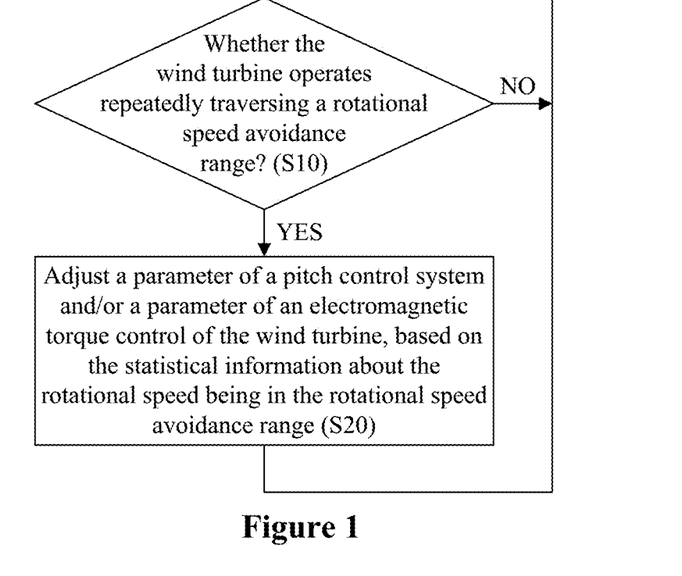
FIG. 1 shows a flowchart of a method for rotational speed avoidance control of a wind turbine according to an exemplary embodiment of the present disclosure.

FIG. 1 shows a flowchart of a method for rotational speed avoidance control of a wind turbine according to an exemplary embodiment of the present disclosure. The method may be implemented through a computer program. As an example, the method may be run offline or online. As an example, the method may be performed through a controller (such as a master controller) of a wind farm or a controller of a wind turbine.

Reference is made to FIG. 1. In step S10, it is identified whether a wind turbine operates repeatedly traversing a rotational speed avoidance range, based on statistical information about a rotational speed of a generator being in the rotational speed avoidance range.

As an example, the rotational speed of the generator may be determined as a rotational speed of a rotor of the generator.

As an example, the statistical information about the rotational speed of the generator being in the rotational speed avoidance range may be statistical information that can be used to determine whether the rotational speed of the generator is often in or frequently enters the rotational speed avoidance range. As an example, the statistical information about the rotational speed of the generator being in the rotational speed avoidance range may include: a statistical duration of the rotational speed of the generator being in the rotational speed avoidance range, and/or a statistical number of times of the rotational speed of the generator entering the rotational speed avoidance range.

As an example, the rotational speed avoidance of the wind turbine refers to a situation in which the rotational speed of the generator enters or is in the rotational speed avoidance range. As an example, it may be determined that the wind turbine operates repeatedly traversing the rotational speed avoidance range, in response to the statistical information about the rotational speed of the generator being in the rotational speed avoidance range showing that the rotational speed is often in or frequently enters the rotational speed avoidance range beyond a certain level.

The rotational speed avoidance control/rotational speed traverse control is a function/strategy for controlling a rotational speed of the generator, and specifically refers to a control of an electromagnetic torque of a converter of the wind turbine and a rotational speed of the rotor of the generator, in order to control the wind turbine to operate quickly traversing a certain rotational speed range (i.e., the rotational speed avoidance range) during the power generation process, and thus to prevent the rotational speed from being within the rotational speed range for a long time which may cause resonance of the wind turbine, overloading or other problem. The rotational speed avoidance range mentioned in the present disclosure may be set in consideration of resonance, load reduction or other condition, which is not limited in the present disclosure.

Figure 2:
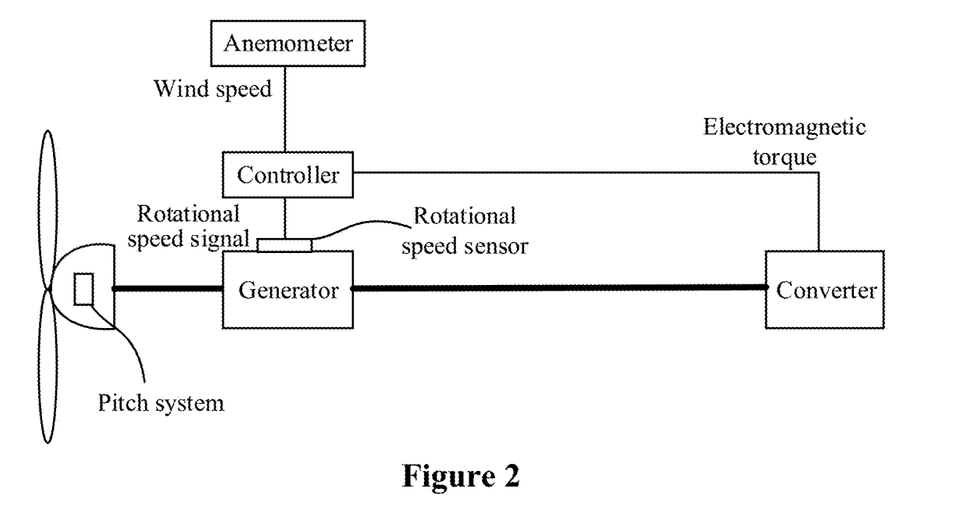
FIG. 2 shows a schematic structural diagram of a wind turbine according to an exemplary embodiment of the present disclosure.

Reference is made to FIG. 2. In a wind turbine, an impeller captures wind energy, and a generator and a converter constitute an energy conversion unit for converting the wind energy into electrical energy which is transmitted to a power grid. In an example as shown in FIG. 2, the generator includes a stator, and a rotor mechanically connected to the impeller. The converter is electrically coupled to a winding of the stator. In this example, the generator is a permanent magnet generator, with magnetic steel disposed in the rotor. The wind turbine is a direct-driven wind turbine. The converter is a full-power converter, and the electrical energy converted from the wind energy is all fed into the power grid. A controller of the wind turbine is configured to collect a wind speed and a current rotational speed of the generator, and issue an electromagnetic torque control signal to the converter, to control a current in the winding of the stator of the generator, and thus to control the rotational speed of the rotor of the generator. According to an aerodynamic torque formula, $T_a = 0.5 \rho C_q \pi R^3 V^2$, an aerodynamic torque $T_a$ is proportional to a square of a wind speed V. In the formula, $\rho$ represents an air density of an external environment where the wind turbine is located, $C_q$ represents a torque coefficient of the wind turbine, and R represents a radius of the impeller. The wind turbine may control a pitch angle of each blade through a pitch system, so as to limit absorption of energy from a wind flow by the impeller, and hence to adjust the aerodynamic torque. An electromagnetic torque $T_e$ of the generator may be controlled when the generator completes an energy conversion. According to formulas $\Delta T = T_a - T_e$ and $dw = \Delta T / J1$, it can be seen that a differential of the rotational speed of the generator is related to a difference between the aerodynamic torque $T_a$ and the electromagnetic torque $T_e$. In the formula, J1 represents a moment of inertia, and w represents an angular velocity. As can be seen from the above, the wind turbine can control the rotational speed of the wind turbine by adjusting the aerodynamic torque $T_a$ and the electromagnetic torque $T_e$ through the pitch mechanism.

Figure 3:
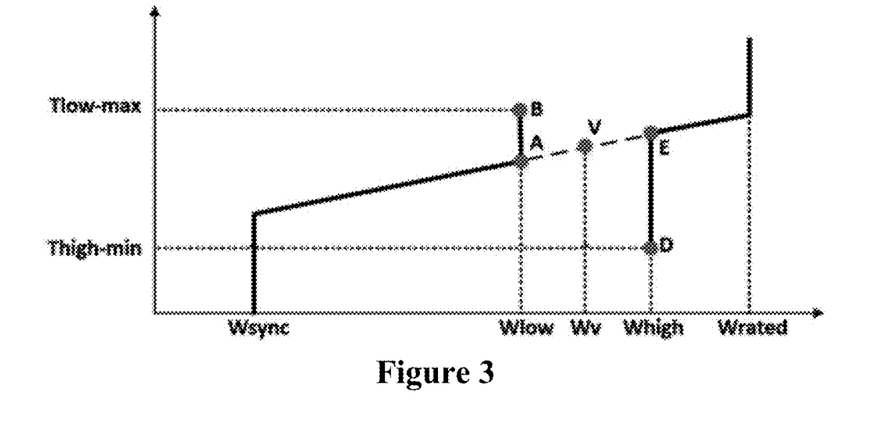
FIG. 3 is a diagram showing a principle of rotational speed avoidance control according to an exemplary embodiment of the present disclosure.

FIG. 3 shows an operating curve of a relation between a rotational speed of the generator and an electromagnetic torque. In FIG. 3, an ordinate indicates an electromagnetic torque, and an abscissa indicates a rotational speed. When the wind turbine is running normally, a rotational speed of the wind turbine is in a range from Wsync to Wrated. A range from Wlow to Whigh is a rotational speed avoidance range, where Wlow represents a lower boundary of the rotational speed avoidance range, and Whigh represents an upper boundary of the rotational speed avoidance range. The wind turbine cannot operate at a rotational speed within the rotational speed avoidance range for a long time. A Tlow-max corresponds to an electromagnetic torque control requirement at the rotational speed Wlow, and a Thigh-min corresponds to an electromagnetic torque control requirement at the rotational speed Whigh. Specifically, when the rotational speed reaches point A with the wind speed, the rotational speed cannot increase further and should be controlled at Wlow, under the rotational speed avoidance control requirement. With the wind speed increases further, in order to maintain the rotational speed at Wlow, the electromagnetic torque is increased until reaching Tlow-max (i.e., point B). After the electromagnetic torque stays at point B for T1 seconds, the rotational speed is increased at a rate of V1 rad/s, until the rotational speed reaches Whigh, that is, the wind turbine is in an operating state at point E. If the wind speed further increases, the rotational speed will continue to increase. When the wind speed decreases at point E, the rotational speed cannot decrease and should be controlled at Whigh, under the rotational speed avoidance control requirement. With the wind speed decreases, in order to maintain the rotational speed at Whigh, the electromagnetic torque is decreased until reaching Thigh-min (i.e., reaching point D). After the electromagnetic torque stays at point D for T2 seconds, the rotational speed is decreased at a rate of V2 rad/s, so as to jump to point A. The Wlow and Whigh may be determined based on a design frequency of the wind turbine, for example, an inherent frequency of a structural component, such as the tower. It should be understood that the rotational speed avoidance range is an open range.

In consideration of an accuracy of control, a range may be reserved at both ends of the rotational speed avoidance range, and the rotational speed being in either of the reserved intervals is considered as a normal operation condition. As an example, the statistical information about the rotational speed of the generator being in the rotational speed avoidance range may include: a statistical duration of the rotational speed of the generator being in a first preset range in the rotational speed avoidance range, and/or a statistical number of times of the rotational speed of the generator entering the first preset range. Here, the first preset range may be: (Wlow+We1, Whigh−We2).

As an example, the rotational speed of the generator may or may not be equal to the rotational speed of the impeller.

In an embodiment, it may be identified whether the wind turbine operates repeatedly traversing the rotational speed avoidance range, based on the statistical number of times of the rotational speed of the generator entering the rotational speed avoidance range. Specifically, based on operation data in a historical operation period of the wind turbine, it is determined, for each time interval in the historical operation period, a number of jumps that the rotational speed enters the first preset range from a vicinity of a rated rotational speed. It is determined that the wind turbine operates repeatedly traversing the rotational speed avoidance range, in response to a total number of time intervals in the historical operation period, that correspond to the number of jumps greater than a preset standard time, exceeding a second preset number. The length of each time interval is a preset duration.

Figure 4:
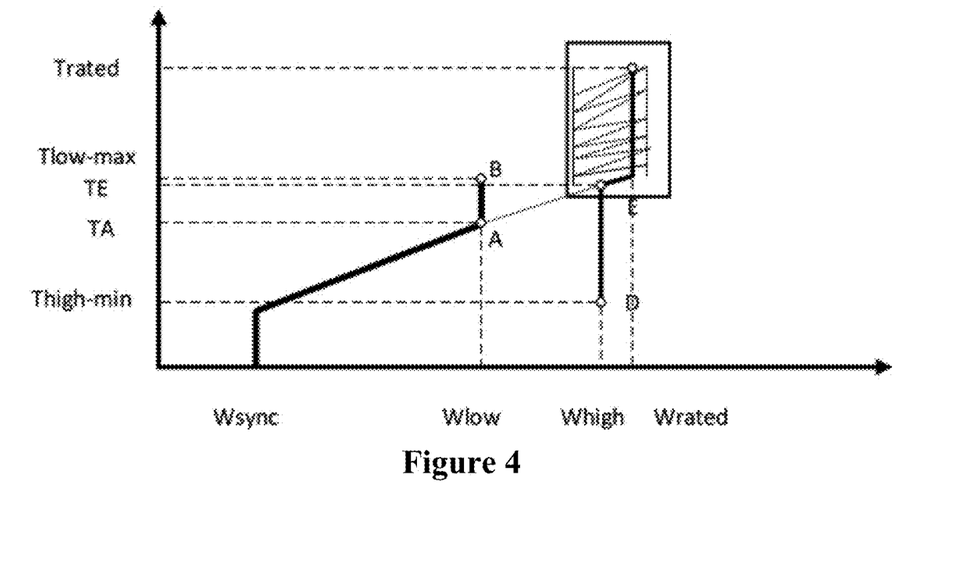
FIG. 4 is an example of an operating curve showing a relation between a rotational speed of a generator and an electromagnetic torque according to an exemplary embodiment of the present disclosure.

FIG. 4 shows an operating curve of a relation between a rotational speed of the generator and an electromagnetic torque. In FIG. 4, an ordinate indicates an electromagnetic torque, and an abscissa indicates a rotational speed. When the wind turbine is running normally, a rotational speed of the wind turbine is in a range from Wsync to Wrated. The Wrated represents a rated rotational speed, and the Trated represents a rated electromagnetic torque. The box in FIG. 4 indicates a working condition in which the rotational speed frequently enters the first preset range from the vicinity of the rated rotational speed. Accordingly, it may be determined that the wind turbine operates repeatedly traversing the rotational speed avoidance range in response to occurrence of such condition.

In another embodiment, it may identified whether the wind turbine operates repeatedly traversing the rotational speed avoidance range, based on the statistical duration of the rotational speed of the generator being in the rotational speed avoidance range. Specifically, based on operation data in a historical operation period of the wind turbine, it is determined a ratio of a rotational speed avoidance duration corresponding to each time interval in the historical operation period. For each time interval, the ratio of the rotational speed avoidance duration corresponding to the time interval refers to a ratio of a total duration, within the time interval, in which the rotational speed is in a first preset range in the rotational speed avoidance range, to a preset duration. It is determined that the wind turbine operates repeatedly traversing the rotational speed avoidance range, in response to a total number of time intervals in the historical operation period, that correspond to ratios of rotational speed avoidance durations greater than a preset standard ratio, exceeding a first preset number.

As an example, the operation data in the historical operation period may be divided into M groups of operation data, with the preset duration as an interval. Each group of operation data includes: N rotational speeds of the generator collected at N consecutive sampling time instants. Namely, one rotational speed is collected at each sampling time instant, and thus there are totally N rotational speeds being collected. For each group, a ratio of the number of rotational speeds, among the N rotational speeds, being in the first preset range, to N serves as the ratio of the rotational speed avoidance duration corresponding to a time interval. M is an integer greater than 1, and N is an integer greater than 1. It should be understood that one group corresponds to one time interval, and different groups correspond to different time intervals.

As an example, the preset standard ratio may indicate a ratio of a total duration within the preset duration, in which the rotational speed is in the rotational speed avoidance range to the preset duration, under a normal jump for the rotational speed avoidance. Therefore, if a ratio of a rotational speed avoidance duration corresponding to a time interval exceeds the standard ratio, it may indicate an abnormality of the rotational speed avoidance in this time interval.

As an example, the preset standard ratio may be determined based on at least one of: a jump-up duration (i.e., (Whigh−Wlow)/V1) required for the wind turbine to operate traversing the rotational speed avoidance range from a low rotational speed to a high rotational speed, a jump-down duration (i.e., (Whigh−Wlow)/V2) required for the wind turbine to operate traversing the rotational speed avoidance range from a high rotational speed to a low rotational speed, a preset number of times that the wind turbine is able to normally operate traversing the rotational speed avoidance range within the preset duration, and a length of the preset duration.

As an example, the preset standard ratio may be calculated as $Ks=T_{max}*I*J/L$, where $T_{max}$ represents a maximum between the jump-up duration and the jump-down duration, I represents a margin coefficient, J represents the preset number of times that the wind turbine is able to normally operate traversing the rotational speed avoidance range within the preset duration, and L represents the length of the preset duration.

Here, the preset number of times that the wind turbine is able to normally operate traversing the rotational speed avoidance range within the preset duration may be determined based on at least one of an actual operation condition, simulation, or human experience. For example, in a case that the length of the preset duration is 20 minutes, the preset number of times that the wind turbine is able to normally operate traversing the rotational speed avoidance range within the preset duration may be 10. In order to reserve a certain margin for determination based on the preset standard ratio, so as to allow a certain deviation, the margin coefficient I is added. For example, I may range from 1.1 to 1.5. As an example, $T_{max}$ may range from 10 s to 30 s. For example, assuming that Wlow=7 rpm, Whigh=11 rpm, and V1=V2=0.2 rpm/s (that is, the rotational speed avoidance control requires to quickly traverse the rotational speed avoidance range at a rate of 0.2 rpm per second), then in a normal condition, a time period for a traversing/jumping the rotational speed avoidance range once is 20 s, that is, T1=T2=(Whigh−Wlow)/V1=20 s. Assuming that the jump-up speed V1 is equal to the jump-down speed V2, then the jump-up duration (Whigh−Wlow)/V1 is equal to the jump-down duration (Whigh−Wlow)/V2), and $T_{max}$=20 s. For example, with L=20 min, J=10, I=1.2, and $T_{max}$=20 s, the preset standard ratio is 0.2.

Figure 5:
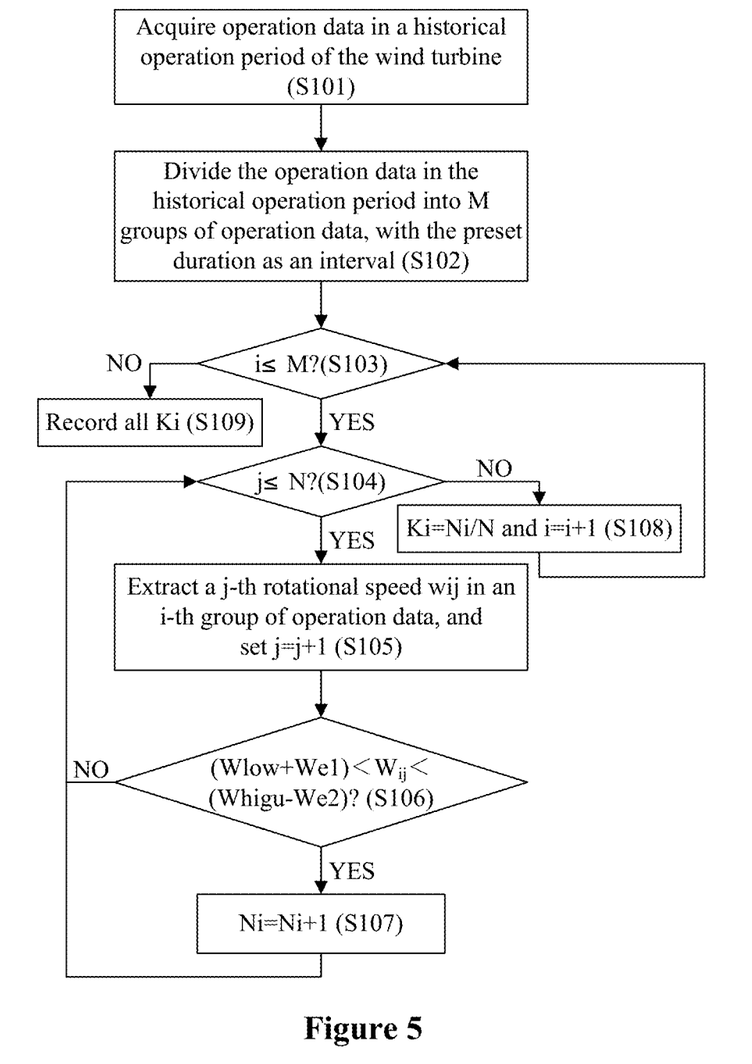
FIG. 5 shows a flowchart of a method for determining a ratio of a rotational speed avoidance duration corresponding to each time interval in a historical operation period according to an exemplary embodiment of the present disclosure.

FIG. 5 shows a flowchart of a method for determining a ratio of a rotational speed avoidance duration corresponding to each time interval in a historical operation period according to an exemplary embodiment of the present disclosure.

Reference is made to FIG. 5. In step S101, operation data in a historical operation period of the wind turbine is acquired. The operation data includes a rotational speed.

In step S102, the operation data in the historical operation period is divided into M groups of operation data, with the preset duration as an interval. Specifically, the historical operation period is divided with the preset duration, and the operation data corresponding to each time interval forms one group of operation data. Each group of operation data includes: N rotational speeds of the generator collected at N consecutive sampling time instants (i.e., N operating points). The N rotational speed values are arranged in an order of the sampling time instants corresponding to the rotational speeds. It should be understood that N depends on the length of the preset duration and a sampling period of the operation data.

As an example, the historical operation period may be the last month, and the preset period may be in a range from 10 min to 30 min.

In step S103, it is determined whether i is less than or equal to M. An initial value of i is 1.

If it is determined in step S103 that i is less than or equal to M, the method proceeds to step S104, to determine whether j is less than or equal to N. An initial value of j is 1.

If it is determined in step S104 that j is less than or equal to N, the method proceeds to step S105, to extract a j-th rotational speed wij in an i-th group of operation data, and increase j by 1, that is, j=j+1.

After step S105, the method proceeds to step S106, to determine whether the extracted j-th rotational speed wij in the i-th group of operation data is greater than (Wlow+We1) and less than (Whigh−We2).

If it is determined in step S106 that the wij is greater than (Wlow+We1) and less than (Whigh−We2), the method proceeds to step S107, to increase Ni by 1 (i.e., Ni=Ni+1) and then return to step S104. An initial value of Ni is 0.

If it is determined in step S106 that wij is less than or equal to (Wlow+We1), or wij is greater than or equal to (Whigh−We2), the method returns to step S104.

If it is determined in step S104 that j is greater than N, the method proceeds to step S108, to set Ki to be Ni/N (i.e., Ki=Ni/K) and increase i by 1 (i.e., i=i+1), and then return to step S103.

If it is determined in step S103 that i is greater than M, the method proceeds to step S109 to record all Ki, that is, to record K1, K2, K3, . . . , and KM. Here, each Ki represents a ratio of a rotational speed avoidance duration corresponding to a time interval in the historical operation period.

Reference is made again to FIG. 1. In a case that it is determined in step S10 that the wind turbine operates repeatedly traversing the rotational speed avoidance range, the method proceeds to step S20. In step S20, a parameter of a pitch control system and/or a parameter of an electromagnetic torque control of the wind turbine are adjusted based on the statistical information about the rotational speed being in the rotational speed avoidance range. As a result, the wind turbine can control the rotational speed based on the adjusted parameter of the pitch control system and/or the adjusted parameter of the electromagnetic torque control, so as to avoid the rotational speed of the wind turbine repeatedly traversing the rotational speed avoidance range.

Figure 6:
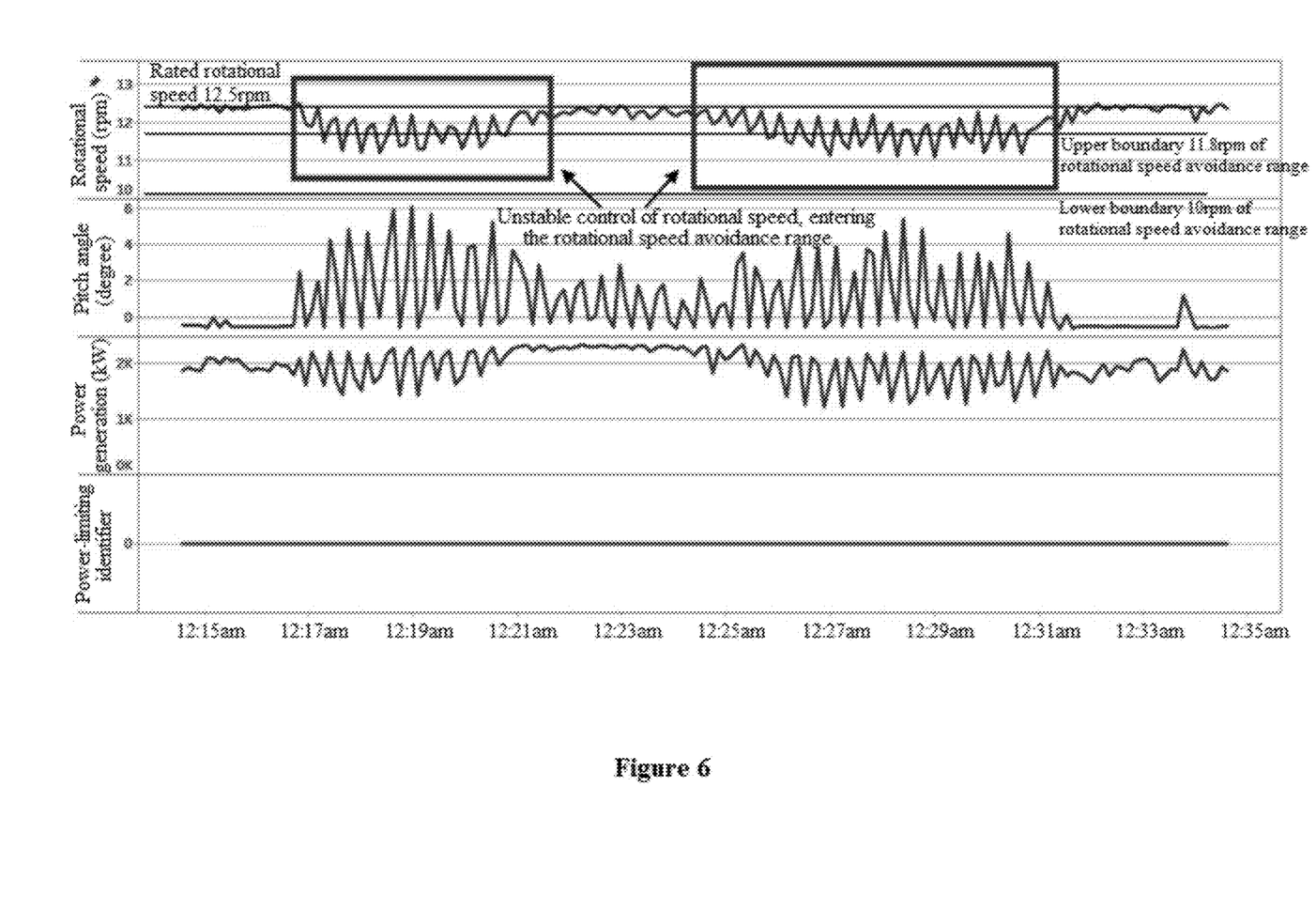
FIG. 6 shows an example in which a rotational speed of a wind turbine repeatedly enters a rotational speed avoidance range according to an exemplary embodiment of the present disclosure.

The problem that the wind turbine operates repeatedly traversing the rotational speed avoidance range is considered in the present disclosure. As shown in FIG. 6, the rotational speed avoidance range is (10, 11.8), and a rated rotational speed is 12.5 rpm. FIG. 6 shows a situation where the rotational speed of the wind turbine repeatedly enters the rotational speed avoidance range, which may result in abnormal resonance, overloading, or other problem of the wind turbine. Based on analysis made in the present disclosure, it is known that this situation generally happens when a rated rotational speed Wrated is designed to be close to the upper boundary value Whigh of the rotational speed avoidance range. Then, if a pitch or torque control parameter is not set properly, the rotational speed will not be controlled stably, and the rotational speed will fluctuate from the rated rotational speed to be within the rotational speed avoidance range. As can be seen from FIG. 6, the rated rotational speed should be controlled at 12.5 rpm, but the rotational speed may fluctuate greatly under unstable control, and the rotational speed may fluctuate at most to be lower than the upper boundary value Whigh of the rotational speed avoidance range, resulting in the rotational speed operating within the rotational speed avoidance range.

In the conventional technology, there is still lack of an evaluation on abnormality that the wind turbine operates repeatedly traversing the rotational speed avoidance range, since reasons for the above abnormality are hard to be found in prototyping testing due to its uncertainty. The abnormality that the wind turbine operates repeatedly traversing the rotational speed avoidance range often brings the following two problems. One of the problems is that the wind turbine runs in the rotational speed avoidance range for a long time, and a shutdown failure may occur when vibration increases to a corresponding protection threshold. Another problem is that the wind turbine runs in the rotational speed avoidance range for a long time or a short time, and an impact (such as a shutdown failure) may not be shown for a short term before the vibration reaches the corresponding protection threshold, but it may lead to loss of power generation, fatigue of components, and a reduced life of components after a long-term accumulation, resulting in the loss of power generation and damage of components. However, even so, it is difficult to find that the above problems are caused due to the abnormality of the rotational speed avoidance.

As an example, a parameter of a pitch control system and/or a parameter of an electromagnetic torque control of the wind turbine may be adjusted based on the statistical information about the rotational speed being in the rotational speed avoidance range, so as to avoid a situation where the rotational speed deviates from the rated rotational speed and enters the rotational speed avoidance range due to an over-adjustment of the rotational speed.

As an example, the parameter of the pitch control system includes a PID parameter of a PID control used in the pitch control system. Here, the PID control used in the pitch control system is for controlling a pitch angle of a blade, based on a measured value of the pitch angle of the blade or the like.

As an example, the parameter of the electromagnetic torque control may include a PID parameter of a PID control used in the electromagnetic torque control. Here, the PID control used in the electromagnetic torque control is for controlling an electromagnetic torque based on a measured value of the electromagnetic torque or the like.

As an example, based on the statistical information about the rotational speed being in the rotational speed avoidance range, the PID parameter of the PID control used in the pitch control system may be reduced, and/or the PID parameter of the PID control used in the electromagnetic torque control may be reduced.

As an example, the parameter of the pitch control system and/or the parameter of the electromagnetic torque control of the wind turbine may be adjusted based on a distribution of ratios of rotational speed avoidance durations corresponding to the time intervals, in the historical operation period, that correspond to ratios of rotational speed avoidance durations greater than the preset standard ratio. Specifically, a reason for an abnormality of the rotational speed avoidance may be determined based on a distribution of abnormal ratios of rotational speed avoidance durations (that is, ratios of rotational speed avoidance durations exceeding the preset standard ratio). In a case that the distribution of the abnormal ratios of the rotational speed avoidance durations indicates that the pitch control parameter and/or the electromagnetic torque control parameter are set improper, resulting in unstable control in the vicinity of the rated rotational speed and greatly fluctuation of the rotational speed. In this case, if a difference between the upper boundary value of the rotational speed avoidance range and the rated rotational speed value is small, the rotational speed may fluctuate from the rated rotational speed value to be within the rotational speed avoidance range. Therefore, the parameter of the pitch control system and/or the parameter of the electromagnetic torque control of the wind turbine may be adjusted accordingly.

As an example, the parameter of the pitch control system and/or the parameter of the electromagnetic torque control of the wind turbine may be adjusted, in response to a number of time intervals, in the historical operation period, that correspond to ratios of rotational speed avoidance durations greater than the preset standard ratio and correspond to a preset wind speed range, exceeding a third preset number. The preset wind speed range is a wind speed range in the vicinity of a wind speed corresponding to the rated rotational speed. As an example, in a wind speed range corresponding to the rated rotational speed, the rotational speed will be at the rated rotational speed. As an example, a wind speed range in the vicinity of the wind speed range corresponding to the rated rotational speed may include the wind speed range corresponding to the rated rotational speed, have a lower boundary value less than the lower boundary value of the wind speed range corresponding to the rated rotational speed by a first preset value, and have an upper boundary value greater than the upper boundary value of the wind speed range corresponding to the rated rotational speed by a second preset value. During the time interval corresponding to the preset wind speed range, an ambient wind speed for the wind turbine is in the preset wind speed range.

As an example, an adjustment amount for the parameter of the pitch control system and/or for the parameter of the electromagnetic torque control may be determined, based on a distribution of the ratios of the rotational speed avoidance durations corresponding to time intervals, corresponding to a preset wind speed range and in which a ratio of the rotational speed avoidance duration exceeds the preset standard ratio in the historical operation period, and the parameter of the pitch control system and/or the parameter of the electromagnetic torque control may be adjusted based on the determined adjustment amount. It should be understood that a difference between a current value of the parameter of the pitch control system and/or the parameter of the electromagnetic torque control and the determined corresponding adjustment amount is a value of the parameter after the adjustment. It should be understood that the adjustment amounts determined for different parameters in pitch control may be different or the same, and the adjustment amounts determined for different parameters in electromagnetic torque control may be different or the same.

As an example, the greater the degrees and/or the greater the number of the ratios of the rotational speed avoidance durations corresponding to time intervals, corresponding to the preset wind speed range and in which a ratio of the rotational speed avoidance duration exceeds the preset standard ratio in the historical operation period, differing from the preset standard ratio, the greater the adjustment amount for the parameter of the pitch control system and/or for the parameter of the electromagnetic torque control is. In other words, the adjustment amount is in a positive correlation with: a deviation of the ratios of the rotational speed avoidance durations satisfying a preset condition from the preset standard ratio and/or the number of said ratios of the rotational speed avoidance durations away from the preset standard ratio. The preset condition is that the ratio of the rotational speed avoidance duration exceeds the preset standard ratio and corresponds to a time interval corresponding to the preset wind speed range.

In an embodiment, the operation data used in the method according to the exemplary embodiment of the present disclosure may be operation data of multiple wind turbines with a same model in the wind farm. The parameter of the pitch control system and/or the parameter of the electromagnetic torque control of the multiple wind turbines with this model may be adjusted uniformly through the method. Accordingly, the method may be performed by a controller of the wind farm.

In another embodiment, the operation data used in the method according to the exemplary embodiment of the present disclosure may be operation data of a single wind turbine. The parameter of the pitch control system and/or the parameter of the electromagnetic torque control of the wind turbine may be adjusted independently. Correspondingly, the method may be performed by a controller of the wind farm or a controller of the wind turbine.

Figure 7:
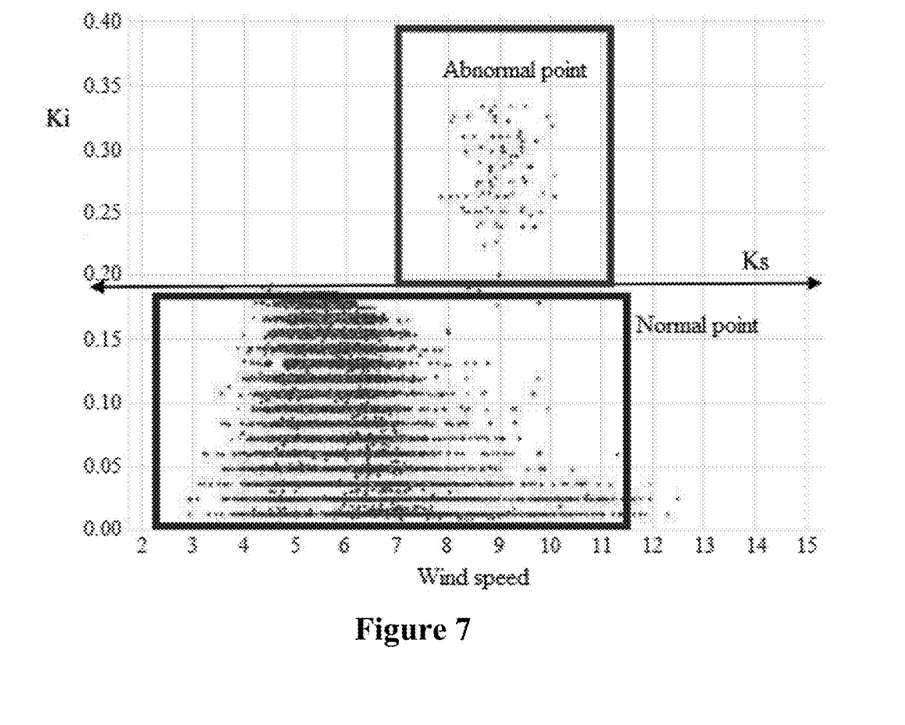
FIG. 7 shows a distribution of ratios of rotational speed avoidance durations according to an exemplary embodiment of the present disclosure.
Figure 8:
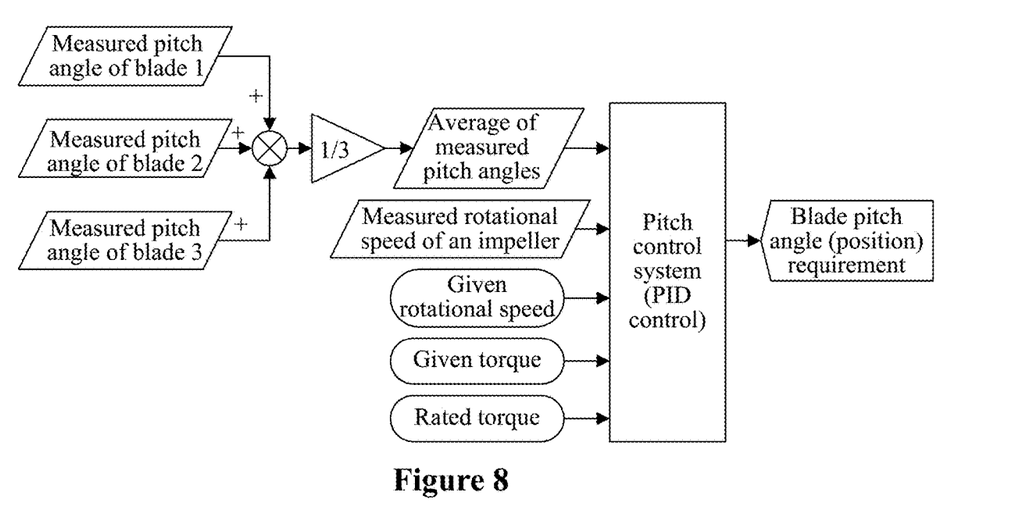
FIG. 8 shows an example of a pitch control according to an exemplary embodiment of the present disclosure.

FIG. 7 shows a distribution of ratios Ki of rotational speed avoidance durations corresponding to different time intervals for all wind turbines with a same model in a wind farm. In FIG. 7, an abscissa indicates a wind speed, an ordinate indicates the value of Ki, a preset standard ratio Ks is 0.2, and each point indicates a ratio of the rotational speed avoidance duration corresponding to a time interval for a wind turbine. Therefore, a point at which the ratio of the rotational speed avoidance duration exceeds 0.2 is an abnormal point; otherwise the point is a normal point. It can be seen that point sets in FIG. 7 forms a triangular structure on the left, with a wind speed in the vicinity of 6 m/s as a center. The center corresponds to an exact middle of the wind speed range corresponding to the rotational speed avoidance range, and energy provided by the wind makes the rotational speed between the upper and lower boundary values of the rotational speed avoidance range. In a case that the wind speed is low, the rotational speed may stay at the lower boundary value for a long time. In a case that the wind speed is high, the rotational speed may stay at the upper boundary value for a long time. The triangular structure on the left is normal, but there are obviously outlier scatter points on the right. These scatter points appear at high wind speeds, and most of Ki corresponding to these scatter points exceed 0.2. Therefore, based on such distribution of the ratios of the rotational speed avoidance durations (that is, there are a large number of abnormal points, and these abnormal points correspond to high wind speeds), it may be determined that a reason for the abnormality of the rotational speed avoidance of the wind turbine is that: in a high wind speed range, the wind turbine operates with a full or close to full power, and at this time the rotational speed is close to the rated rotational speed; and a pitch function starts to be enabled with an increase of power. As shown in FIG. 8, the pitch control system usually performs a PID control based on a current electromagnetic torque/power and a target rotational speed. However, a problem may occur to the pitch execution in a case of unreasonable setting of a PID parameter or a torque control parameter. The fluctuation of the rotational speed shown in the box of FIG. 6 is caused by the problem in pitch execution. When the rotational speed fluctuates into the rotational speed avoidance range, Ki may be abnormally high in the high wind speed range, and scatter points appear. Therefore, such problem may be overcome by adjusting the parameter of the pitch control system and/or the parameter of the electromagnetic torque control of the wind turbine, and further, an adjustment amount may be determined based on a distribution of the abnormal points. For example, in a case of a greater deviation of the abnormal points corresponding to high wind speeds from the preset standard ratio Ks and a greater number of the abnormal points corresponding to the high wind speeds away from the preset standard ratio Ks, a greater value of the adjustment amount for the parameter of the pitch control system and/or for the parameter of the electromagnetic torque control may be determined.

According to the exemplary embodiments of the present disclosure, it is able to quickly and accurately evaluate whether there is an abnormality in the rotational speed avoidance of the wind turbine, and perform, in combination with root-cause analysis and diagnosis, adjustment on the parameter of the pitch control system and/or the parameter of the electromagnetic torque control according to a reason of the abnormality of the rotational speed avoidance, so as to jump out of the abnormality and return to a normal operating state of the wind turbine, avoiding a further over-vibration and over-loading.

Figure 9:
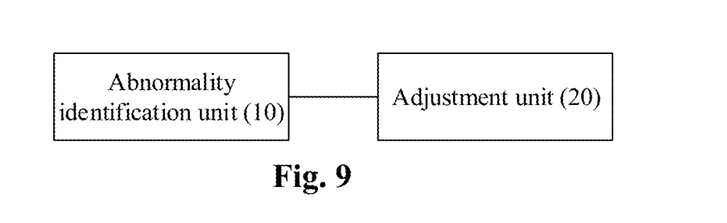
FIG. 9 shows a block diagram of an apparatus for rotational speed avoidance control of a wind turbine according to an exemplary embodiment of the present disclosure.

FIG. 9 shows a block diagram of an apparatus for rotational speed avoidance control of a wind turbine according to an exemplary embodiment of the present disclosure.

As shown in FIG. 9, the apparatus for rotational speed avoidance control of the wind turbine includes: an abnormality identification unit 10 and an adjustment unit 20.

The abnormality identification unit 10 is configured to identify whether a wind turbine operates repeatedly traversing a rotational speed avoidance range, based on statistical information about a rotational speed of a generator being in the rotational speed avoidance range.

The adjustment unit 20 is configured to adjust a parameter of a pitch control system and/or a parameter of an electromagnetic torque control of the wind turbine based on the statistical information about the rotational speed being in the rotational speed avoidance range, in response to determining that the wind turbine operates repeatedly traversing the rotational speed avoidance range.

As an example, the statistical information about the rotational speed of the generator being in the rotational speed avoidance range may include: a statistical duration of the rotational speed of the generator being in the rotational speed avoidance range, and/or a statistical number of times of the rotational speed of the generator entering the rotational speed avoidance range.

As an example, the abnormality identification unit 10 may be configured to: determine, based on operation data in a historical operation period of the wind turbine, a ratio of a rotational speed avoidance duration corresponding to each time interval in the historical operation period; and determine that the wind turbine operates repeatedly traversing the rotational speed avoidance range, in response to a total number of time intervals in the historical operation period, that correspond to ratios of rotational speed avoidance durations greater than a preset standard ratio, exceeding a first preset number. For each time interval, the ratio of the rotational speed avoidance duration corresponding to the time interval refers to a ratio of a total duration, within the time interval, in which the rotational speed is in a first preset range in the rotational speed avoidance range, to a preset duration. A length of each time interval is equal to the preset duration.

As an example, the abnormality identification unit 10 may be configured to: determine, based on operation data in the historical operation period of the wind turbine, for each time interval in the historical operation period, a number of jumps that the rotational speed enters the first preset range from a vicinity of a rated rotational speed; and determine that the wind turbine operates repeatedly traversing the rotational speed avoidance range, in response to a total number of time intervals in the historical operation period, that correspond to the number of jumps greater than a preset standard time, exceeding a second preset number.

As an example, the abnormality identification unit 10 may be configured to: divide the operation data in the historical operation period into M groups of operation data, with the preset duration as an interval. Each group of operation data includes: N rotational speeds of the generator collected at N consecutive sampling time instants. For each group, a ratio of the number of rotational speeds, among the N rotational speeds, being in the first preset range, to N serves as the ratio of the rotational speed avoidance duration corresponding to a time interval. M is an integer greater than 1, and N is an integer greater than 1.

As an example, the preset standard ratio may be determined based on at least one of: a jump-up duration required for the wind turbine to operate traversing the rotational speed avoidance range from a low rotational speed to a high rotational speed, a jump-down duration required for the wind turbine to operate traversing the rotational speed avoidance range from a high rotational speed to a low rotational speed, a preset number of times that the wind turbine is able to normally operate traversing the rotational speed avoidance range within the preset duration, and a length of the preset duration.

As an example, the preset standard ratio may be calculated as $T_{max}*I*J/L$, where $T_{max}$ represents a maximum between the jump-up duration and the jump-down duration, I represents a margin coefficient, J represents the preset number of times that the wind turbine is able to normally operate traversing the rotational speed avoidance range within the preset duration, and L represents the length of the preset duration.

As an example, the parameter of the pitch control system may include a PID parameter of a PID control used in the pitch control system.

As an example, the parameter of the electromagnetic torque control may include a PID parameter of a PID control used in the electromagnetic torque control.

As an example, the adjustment unit 20 may be configured to: reduce the PID parameter of the PID control used in the pitch control system, and/or reduce the PID parameter of the PID control used in the electromagnetic torque control, based on the statistical information about the rotational speed being in the rotational speed avoidance range.

As an example, the adjustment unit 20 may be configured to: adjust the parameter of the pitch control system and/or the parameter of the electromagnetic torque control of the wind turbine, based on a distribution of ratios of rotational speed avoidance durations corresponding to the time intervals, in the historical operation period, that correspond to ratios of rotational speed avoidance durations greater than the preset standard ratio.

As an example, the adjustment unit 20 may be configured to: adjust the parameter of the pitch control system and/or the parameter of the electromagnetic torque control of the wind turbine, in response to a number of time intervals, in the historical operation period, that correspond to ratios of rotational speed avoidance durations greater than a preset standard ratio and correspond to a preset wind speed range, exceeding a third preset number. The preset wind speed range is a wind speed range in the vicinity of a wind speed corresponding to the rated rotational speed.

As an example, the adjustment unit 20 may be configured to: determine an adjustment amount for the parameter of the pitch control system and/or for the parameter of the electromagnetic torque control, based on a distribution of the ratios of the rotational speed avoidance durations corresponding to the time intervals, corresponding to the preset wind speed range and in which a ratio of the rotational speed avoidance duration exceeds the preset standard ratio in the historical operation period; and adjust the parameter of the pitch control system and/or the parameter of the electromagnetic torque control based on the determined adjustment amount. The preset wind speed range is a wind speed range in the vicinity of a wind speed corresponding to the rated rotational speed.

As an example, the greater the degrees and/or the greater the number of the ratios of the rotational speed avoidance durations corresponding to time intervals, corresponding to the preset wind speed range and in which a ratio of the rotational speed avoidance duration exceeds the preset standard ratio in the historical operation period, differing from the preset standard ratio, the greater the adjustment amount for the parameter of the pitch control system and/or for the parameter of the electromagnetic torque control is.

It should be understood that a specific processing performed by the apparatus for rotational speed avoidance control of the wind turbine according to the exemplary embodiments of the present disclosure has been described in detail with reference to FIG. 1 to FIG. 8, and relevant details thereof are not repeated here.

It should be understood that each unit in the apparatus for rotational speed avoidance control of the wind turbine according to the exemplary embodiments of the present disclosure may be implemented through hardware components and/or software components. Those skilled in the art may implement each unit by using, for example, a Field Programmable Gate Array (FPGA) or an Application Specific Integrated Circuit (ASIC) according to the processing performed by the unit as defined.

In addition, a wind turbine is further provided according to an exemplary embodiment of the present disclosure. As shown in FIG. 2, the wind turbine includes a generator, a converter, a data collection module (not shown) and a controller. The generator includes a stator, and a rotor mechanically connected to an impeller. The converter is electrically coupled to a winding of the stator. The data collection module is configured to collect a rotational speed of the rotor of the generator. The controller is configured to set an electromagnetic torque parameter of the converter, to control a current in the winding of the stator, thereby controlling the rotational speed of the rotor of the generator. The controller is configured to perform the method for rotational speed avoidance control of a wind turbine according to the above exemplary embodiments. As an example, the data collection module may include a rotational speed sensor. In addition, the data collection module may be configured to collect information of the wind turbine, such as an electromagnetic torque, an ambient wind speed, or the like.

In addition, a wind turbine is further provided according to an exemplary embodiment of the present disclosure. As shown in FIG. 2, the wind turbine includes a generator, a converter, a data collection module (not shown) and a controller. The generator includes a stator, and a rotor mechanically connected to an impeller. The converter is electrically coupled to a winding of the stator. The data collection module is configured to collect a rotational speed of the rotor of the generator. The controller is configured to set an electromagnetic torque parameter of the converter, to control a current in the winding of the stator, thereby controlling the rotational speed of the rotor of the generator. The controller includes the apparatus for rotational speed avoidance control of a wind turbine according to the above exemplary embodiments.

A computer-readable storage medium storing a computer program is further provided according to an exemplary embodiment of the present disclosure. The computer program, when executed by a processor, causes the method for rotational speed avoidance control of a wind turbine according to the above exemplary embodiments to be implemented. The computer-readable storage medium is any data storage device that can store data read by a computer system. An example of the computer-readable storage medium included a read-only memory, a random-access memory, a CD-ROM, a magnetic tape, a floppy disk, an optical data storage device, and a carrier wave (such as data transmission over the Internet via a wired or wireless transmission path).

Although some exemplary embodiments of the present disclosure are illustrated and described, it should be understood by those skilled in the art that modifications may be made to the embodiments without departing from the principle and spirit of the present disclosure whose scope is defined in the claims and equivalents thereof.

The invention claimed is:

1. A method for rotational speed avoidance control of a wind turbine, comprising:
identifying whether a wind turbine operates repeatedly traversing a rotational speed avoidance range, based on statistical information about a rotational speed of a generator being in the rotational speed avoidance range; and
adjusting a parameter of a pitch control system and/or a parameter of an electromagnetic torque control of the wind turbine based on the statistical information about the rotational speed being in the rotational speed avoidance range, in response to determining that the wind turbine operates repeatedly traversing the rotational speed avoidance range.

2. The method according to claim 1, wherein the statistical information about the rotational speed of the generator being in the rotational speed avoidance range comprises: a statistical duration of the rotational speed of the generator being in the rotational speed avoidance range, and/or a statistical number of times of the rotational speed of the generator entering the rotational speed avoidance range.

3. The method according to claim 2, wherein the identifying whether the wind turbine operates repeatedly traversing the rotational speed avoidance range based on the statistical information about the rotational speed of the generator being in the rotational speed avoidance range comprises:
determining, based on operation data in a historical operation period of the wind turbine, for each time interval in the historical operation period, a ratio of a rotational speed avoidance duration corresponding to the time interval, wherein for each time interval, the ratio of the rotational speed avoidance duration corresponding to the time interval refers to a ratio of a total duration, within the time interval, in which the rotational speed is in a first preset range in the rotational speed avoidance range, to a preset duration; and
determining that the wind turbine operates repeatedly traversing the rotational speed avoidance range, in response to a total number of time intervals in the historical operation period, that correspond to ratios of rotational speed avoidance durations greater than a preset standard ratio, exceeding a first preset number; or,
determining, based on the operation data in the historical operation period of the wind turbine, for each time interval in the historical operation period, a number of jumps that the rotational speed enters the first preset range from a vicinity of a rated rotational speed; and
determining that the wind turbine operates repeatedly traversing the rotational speed avoidance range, in response to a total number of time intervals, in response to a total number of time intervals in the historical operation period, that correspond to the number of jumps greater than a preset standard time, exceeding a second preset number,
wherein the length of each time interval is the preset duration.

4. The method according to claim 3, wherein the preset standard ratio is determined based on at least one of:
a jump-up duration required for the wind turbine to operate traversing the rotational speed avoidance range from a low rotational speed to a high rotational speed,
a jump-down duration required for the wind turbine to operate traversing the rotational speed avoidance range from a high rotational speed to a low rotational speed,
a preset number of times that the wind turbine is able to normally operate traversing the rotational speed avoidance range within the preset duration, and
a length of the preset duration.

5. The method according to claim 4, wherein the preset standard ratio is calculated as $T_{max}*I*J/L$,
wherein $T_{max}$ represents a maximum between the jump-up duration and the jump-down duration, I represents a margin coefficient, J represents the preset number of times that the wind turbine is able to normally operate traversing the rotational speed avoidance range within the preset duration, and L represents the length of the preset duration.

6. The method according to claim 1, wherein
the adjusted parameter of the pitch control system comprises a PID parameter of a PID control used in the pitch control system; and
the adjusted parameter of the electromagnetic torque control comprises a PID parameter of a PID control used in the electromagnetic torque control.

7. The method according to claim 6, wherein the step of adjusting the parameter of the pitch control system and/or the parameter of the electromagnetic torque control of the wind turbine based on the statistical information about the rotational speed being in the rotational speed avoidance range comprises:
reducing the PID parameter of the PID control used in the pitch control system, and/or reducing the PID parameter of the PID control used in the electromagnetic torque control, based on the statistical information of the rotational speed being in the rotational speed avoidance range.

8. The method according to claim 3, wherein the step of adjusting the parameter of the pitch control system and/or the parameter of the electromagnetic torque control of the wind turbine based on the statistical information about the rotational speed being in the rotational speed avoidance range comprises:
adjusting the parameter of the pitch control system and/or the parameter of the electromagnetic torque control of the wind turbine, based on a distribution of the ratios of the rotational speed avoidance durations corresponding to the time intervals, in the historical operation period, that correspond to the ratios of the rotational speed avoidance durations greater than the preset standard ratio.

9. The method according to claim 8, wherein the step of adjusting the parameter of the pitch control system and/or the parameter of the electromagnetic torque control of the wind turbine, based on the distribution of the ratios of the rotational speed avoidance durations corresponding to the time intervals, in the historical operation period, that correspond to the ratios of the rotational speed avoidance durations greater than the preset standard ratio comprises:

adjusting the parameter of the pitch control system and/or the parameter of the electromagnetic torque control of the wind turbine, in response to a number of time intervals, in the historical operation period, that correspond to the ratios of the rotational speed avoidance durations greater than the preset standard ratio and correspond to a preset wind speed range, exceeding a third preset number, wherein the preset wind speed range is a wind speed range in the vicinity of a wind speed corresponding to the rated rotational speed.

10. The method according to claim 8, wherein the step of adjusting the parameter of the pitch control system and/or the parameter of the electromagnetic torque control of the wind turbine, based on the distribution of the ratios of the rotational speed avoidance durations corresponding to the time intervals, in the historical operation period, that correspond to the ratios of the rotational speed avoidance durations greater than the preset standard ratio comprises:

determining an adjustment amount for the parameter of the pitch control system and/or for the parameter of the electromagnetic torque control, based on a distribution of ratios of rotational speed avoidance durations corresponding to time intervals, corresponding to a preset wind speed range and in which a ratio of the rotational speed avoidance duration exceeds the preset standard ratio in the historical operation period; and adjusting the parameter of the pitch control system and/or the parameter of the electromagnetic torque control based on the determined adjustment amount, wherein the preset wind speed range is a wind speed range in the vicinity of a wind speed corresponding to the rated rotational speed.

11. The method according to claim 10, wherein the greater the degrees and/or the greater the number of the ratios of the rotational speed avoidance durations corresponding to time intervals, corresponding to the preset wind speed range and in which a ratio of the rotational speed avoidance duration exceeds the preset standard ratio in the historical operation period, differing from the preset standard ratio, the greater the adjustment amount for the parameter of the pitch control system and/or for the parameter of the electromagnetic torque control is.

12. An apparatus for rotational speed avoidance control of a wind turbine, comprising: a processor and a memory, wherein the memory stores a computer program, when executed by the processor, causes the processor to perform operations comprising:

identifying whether a wind turbine operates repeatedly traversing a rotational speed avoidance range, based on statistical information about a rotational speed of a generator being in the rotational speed avoidance range; and adjusting a parameter of a pitch control system and/or a parameter of an electromagnetic torque control of the wind turbine based on the statistical information about the rotational speed being in the rotational speed avoidance range, in response to determining that the wind turbine operates repeatedly traversing the rotational speed avoidance range.

13. A wind turbine, comprising:

a generator, comprising a stator, and a rotor mechanically connected to an impeller;

a converter electrically coupled to a winding of the stator;

a data collector configured to collect a rotational speed of the rotor of the generator; and a controller, configured to set an electromagnetic torque parameter of the converter, to control the rotational speed of the generator, wherein the controller is configured to perform the method for rotational speed avoidance control according to claim 1.

14. The wind turbine according to claim 13, wherein the generator is a permanent magnet generator, and the wind turbine is a direct-driven wind turbine.

15. A wind turbine, comprising:

a generator, comprising a stator, and a rotor mechanically connected to an impeller;

a converter electrically coupled to a winding of the stator;

a data collector, configured to collect a rotational speed of the rotor of the generator; and a controller, configured to set an electromagnetic torque parameter of the converter, to control the rotational speed of the generator, wherein the controller comprises the apparatus for rotational speed avoidance control of a wind turbine according to claim 12.

16. A non-transitory computer-readable storage medium storing a computer program, wherein the computer program, when executed by a processor, causes the method for rotational speed avoidance control of a wind turbine according to claim 1 to be implemented.

* * * * *